(12) United States Patent
Koizumi (10) Patent No.: US 10,536,624 B2
(45) Date of Patent: Jan. 14, 2020

(54) IMAGE PICKUP APPARATUS AND IMAGE PICKUP METHOD

(71) Applicant: CANON KABUSHIKI KAISHA, Tokyo (JP)

(72) Inventor: Risa Koizumi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 15/730,493

(22) Filed: Oct. 11, 2017

(65) Prior Publication Data

US 2018/0124318 A1 May 3, 2018

(30) Foreign Application Priority Data

Oct. 28, 2016 (JP) .................................. 2016-211522

(51) Int. Cl.
*H04N 5/232* (2006.01)

(52) U.S. Cl.
CPC ... *H04N 5/232133* (2018.08); *H04N 5/23258* (2013.01); *H04N 5/232125* (2018.08); *H04N 5/232122* (2018.08)

(58) Field of Classification Search
CPC .......... H04N 5/23248–23287; H04N 5/23277; H04N 5/23232; H04N 5/23212; H04N 5/232133; H04N 5/232125; G02B 27/64–648; G02B 7/28–40; G03B 2205/0007–0038; G03B 13/32–36; G06T 2207/20212–20221
See application file for complete search history.

(56) References Cited

U.S. PATENT DOCUMENTS

| | | | |
|---|---|---|---|
| 9,635,280 B2* | 4/2017 | Kazami | H04N 5/2352 |
| 2008/0259176 A1* | 10/2008 | Tamaru | G03B 13/32 348/222.1 |
| 2015/0350526 A1* | 12/2015 | Toyoda | H04N 5/23212 348/349 |
| 2018/0067296 A1* | 3/2018 | Sugie | G02B 27/0075 |
| 2018/0084192 A1* | 3/2018 | Suzuki | H04N 5/232122 |

FOREIGN PATENT DOCUMENTS

JP 2002-84444 A 3/2002

* cited by examiner

*Primary Examiner* — Paul M Berardesca
(74) *Attorney, Agent, or Firm* — Canon U.S.A., Inc. IP Division (57) ABSTRACT

An image pickup apparatus includes an imaging unit configured to capture a plurality of images while changing a focus position of an optical system, a setting unit configured to set a plurality of focus positions, a shake detection unit configured to detect a shake of the imaging unit, and a combination unit configured to combine a plurality of images. The setting unit of the image pickup apparatus changes distances between the plurality of focus positions based on a shake amount detected by the shake detection unit.

17 Claims, 8 Drawing Sheets

IMAGE PICKUP APPARATUS AND IMAGE PICKUP METHOD

BACKGROUND OF THE INVENTION

Field of the Invention

The aspect of the embodiments relates to an image pickup apparatus, and more particularly to an image pickup apparatus that can combine a plurality of images captured while changing a focus position.

Description of the Related Art

In capturing an image of a plurality of objects positioned at different distances from a camera or in capturing an image of an object that is long in a depth direction, only a part of the object(s) may be able to be in focus due to an insufficient depth of field of the imaging optical system.

A technique (hereinafter, referred to as focus stacking) for capturing a plurality of images at different focus positions, extracting only in-focus areas from the images, and combining the in-focus areas into an image to generate a combined image in which the entire imaging area is in focus (see Japanese Patent Application Laid-Open No. 2002-84444). By using the focus stacking technique, an image can be obtained in which the entire intended object(s) is/are in focus.

However, if an image is captured by using the focus stacking technique, the following situation can occur in the event of a camera shake.

Figure 8A:
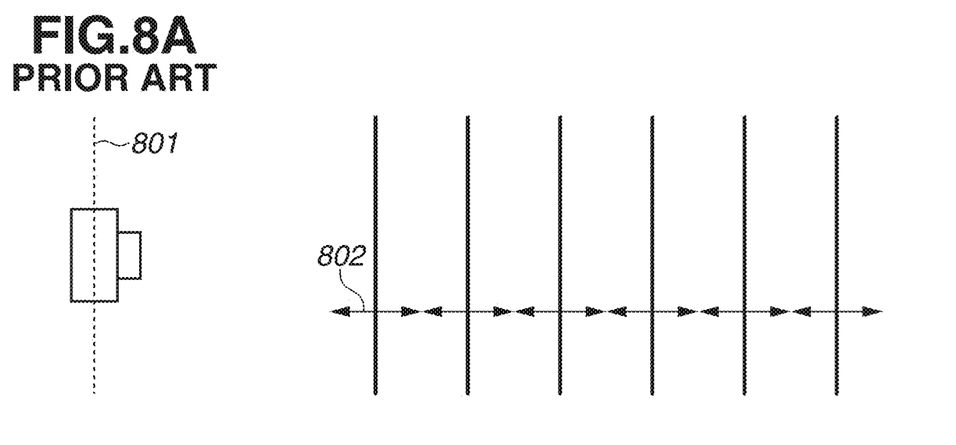
FIGS. 8A to 8C are diagrams illustrating camera shakes in focus stacking.
Figure 8B:
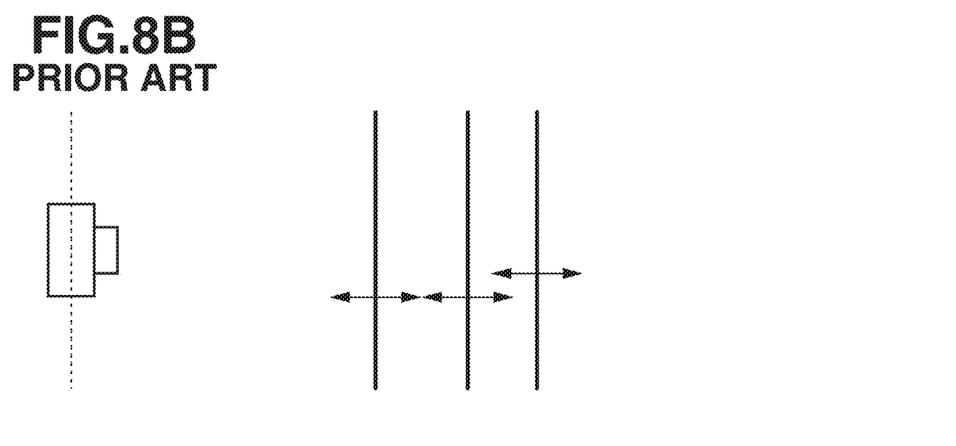
Figure 8C:
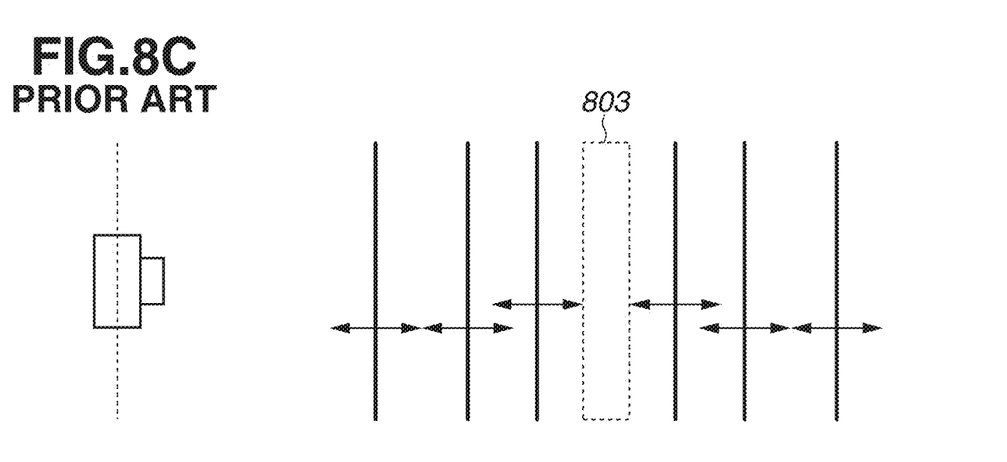

FIGS. 8A to 8C are diagrams illustrating camera shakes in focus stacking. FIG. 8A is a diagram illustrating imaging with ideal focus stacking. FIG. 8A illustrates a state in which the user places a digital camera at an imaging position 801 and captures images a plurality of times while moving a focus position in units of a predetermined distance 802.

FIG. 8B illustrates a case in which a camera shake occurs when the third image is captured in FIG. 8A. The imaging position 801 is shifted backward in the optical axis direction. The focus position when the third image is captured becomes closer to the focus position at which the second image is captured, compared to its original position. FIG. 8C illustrates a case in which a camera shake occurs in a direction opposite to that of the camera shake in FIG. 8B when the fourth image is captured. In such a case, the focus position when the fourth image is captured becomes farther from the focus position at which the third image is captured, compared to its original position. Suppose that combination processing is performed by using the plurality of images captured in FIG. 8C. Since there is no in-focus image in an area 803, a blurred portion remains in the combined image if there is an object included in the area 803.

The predetermined distance 802 may be reduced to increase focus positions so that the focus positions of successively captured images are more likely to fall within the depths of field even when some camera shakes occur. However, capturing images in such a manner increases needless imaging, with wasteful increase in consumption of power and a memory area for recording the images.

SUMMARY OF THE INVENTION

According to an aspect of the embodiments, an image pickup apparatus includes an imaging unit configured to capture a plurality of images while changing a focus position of an optical system, a setting unit configured to set a plurality of focus positions at which the plurality of images is captured, a shake detection unit configured to detect a shake of the imaging unit, and a combination unit configured to combine at least some of the plurality of images, wherein the setting unit is configured to change distances between the plurality of focus positions based on a shake amount detected by the shake detection unit, and set at least some of the plurality of focus positions at equal distances based on the shake amount.

According to another aspect of the embodiment, an image pickup apparatus includes an imaging unit configured to capture a plurality of images while changing a focus position of an optical system during main imaging, a setting unit configured to set a plurality of focus positions at which the plurality of images is captured, a shake detection unit configured to detect a shake of the imaging unit, and a combination unit configured to combine at least some of the plurality of images, wherein the imaging unit is configured to perform pre-imaging before the main imaging, and wherein the setting unit is configured to set the plurality of focus positions based on a shake amount detected by the shake detection unit during the pre-imaging.

Further features of the disclosure will become apparent from the following description of exemplary embodiments with reference to the attached drawings.

DESCRIPTION OF THE EMBODIMENTS

An exemplary embodiment of the disclosure will be described in detail below with reference to the accompanying drawings.

Figure 1:
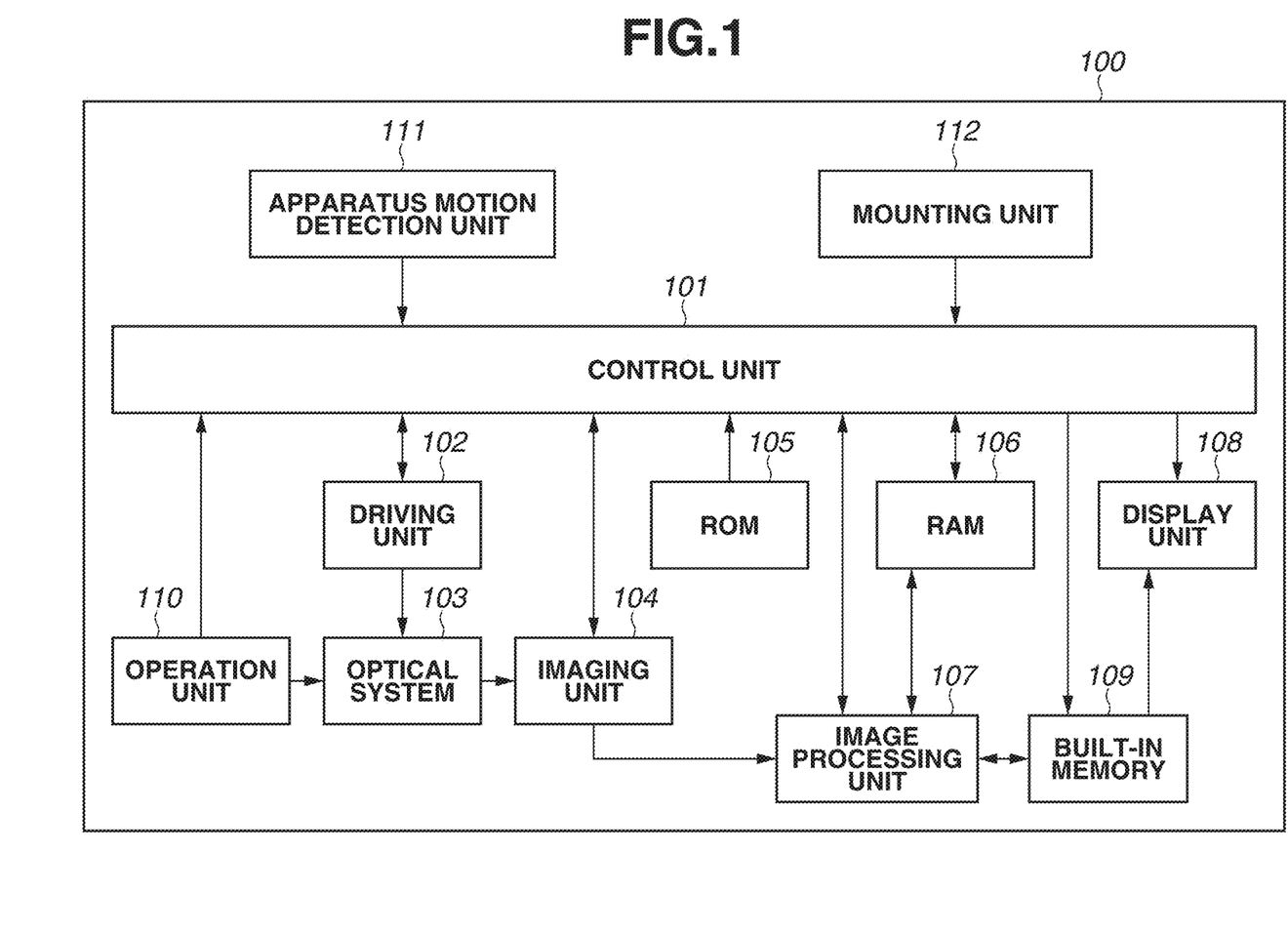
FIG. 1 is a block diagram illustrating a structure of a digital camera according to an exemplary embodiment of the disclosure.

FIG. 1 is a block diagram illustrating a structure of a digital camera according to the present exemplary embodiment. A digital camera 100 can capture a still image, record information about a focus position during imaging, calculate a contrast value, and combine images. The digital camera 100 can also perform enlargement processing and reduction processing on a captured and stored image or an image input from outside.

A control unit 101 is a signal processor such as a central processing unit (CPU) and a microprocessing unit (MPU). The control unit 101 reads a program previously stored in a read-only memory (ROM) 105 and controls various parts of the digital camera 100. For example, as will be described below, the control unit 101 issues commands to start and end imaging to an imaging unit 104. The control unit 101 also issues commands for image processing to an image processing unit 107 based on the program stored in the ROM 105. User's commands are input to the digital camera 100 via an operation unit 110, and delivered to various parts of the digital camera 100 through the control unit 101.

A driving unit 102 includes a motor. The driving unit 102 mechanically operates an optical system 103 under command of the control unit 101. For example, based on commands from the control unit 101, the driving unit 102 moves the position of a focus lens included in the optical system 103 to adjust a focal length of the optical system 103.

The optical system 103 includes a zoom lens, the focus lens, and a diaphragm. The diaphragm is a mechanism for adjusting the amount of light to be transmitted. The focus position can be changed by changing the positions of the lenses.

The imaging unit 104 is a photoelectric conversion element, and performs photoelectrical conversion for converting an incident light signal into an electrical signal. For example, a charge-coupled device (CCD) sensor or a complementary metal-oxide-semiconductor (CMOS) sensor may be applied to the imaging unit 104. The imaging unit 104 has a moving image capturing mode and can capture a plurality of temporally successive images as respective frames of a moving image. A detailed structure and a signal reading method of the sensor included in the imaging unit 104 will be described below.

The ROM 105 is a read-only nonvolatile memory serving as a recording medium. The ROM 105 stores operation programs of respective blocks included in the digital camera 100 as well as parameters needed for operation of the blocks. A random access memory (RAM) 106 is a rewritable volatile memory. The RAM 106 is used as a temporary storage area of data output by the operation of the blocks included in the digital camera 100.

The image processing unit 107 performs various types of image processing on an image output from the imaging unit 104 or data of an image signal recorded in a built-in memory 109. Examples of the image processing include white balance adjustment, color interpolation, and filtering. The image processing unit 107 also performs compression processing of the Joint Photographic Experts Group (JPEG) or other standard on data of an image signal captured by the imaging unit 104.

The image processing unit 107 includes an integrated circuit (application specific integrated circuit (ASIC)) in which circuits for performing specific processing are integrated. The control unit 101 may perform processing according to a program read from the ROM 105 so that the control unit 101 also serves part or all of the functions of the image processing unit 107. If the control unit 101 serves all the functions of the image processing unit 107, the image processing unit 107 does not need to be included as hardware.

A display unit 108 is intended to display images temporarily stored in the RAM 106, images stored in the built-in memory 109, and setting screens of the digital camera 100. Examples of the display unit 108 include a liquid crystal display and an organic electroluminescence (EL) display.

The built-in memory 109 is a location for recording images captured by the imaging unit 104, images processed by the image processing unit 107, and information such as a focus position during image capturing. A memory card may be used instead of the built-in memory 109. The built-in memory 109 has a limited capacity, and is unable to store images or moving images beyond the capacity.

Examples of the operation unit 110 include a button, a switch, a key, and a mode dial provided on the digital camera 100, and a touch panel which also serves as the display unit 108. The user's commands are delivered to the control unit 101 via the operation unit 110.

An apparatus motion detection unit 111 includes a gyro sensor. The apparatus motion detection unit 111 is a device for detecting the motion of the digital camera 100. The apparatus motion detection unit 111 detects movements in a yaw direction and a pitch direction based on angular changes per unit time, i.e., angular speeds of the digital camera 100.

A mounting unit 112 is provided for the purpose of mounting a digital camera 100 on a fixing device such as a tripod. The mounting unit 112 also has a function for fixing detection. If the digital camera 100 is mounted on a tripod, the mounting unit 112 issues information to the control unit 101 that the digital camera 100 is fixed.

<Overview of Focus Stacking>

FIGS. 2A, 2B, 2C, and 2D are diagrams illustrating how an object image is focused on an imaging plane.

Figures 2A, 2B:
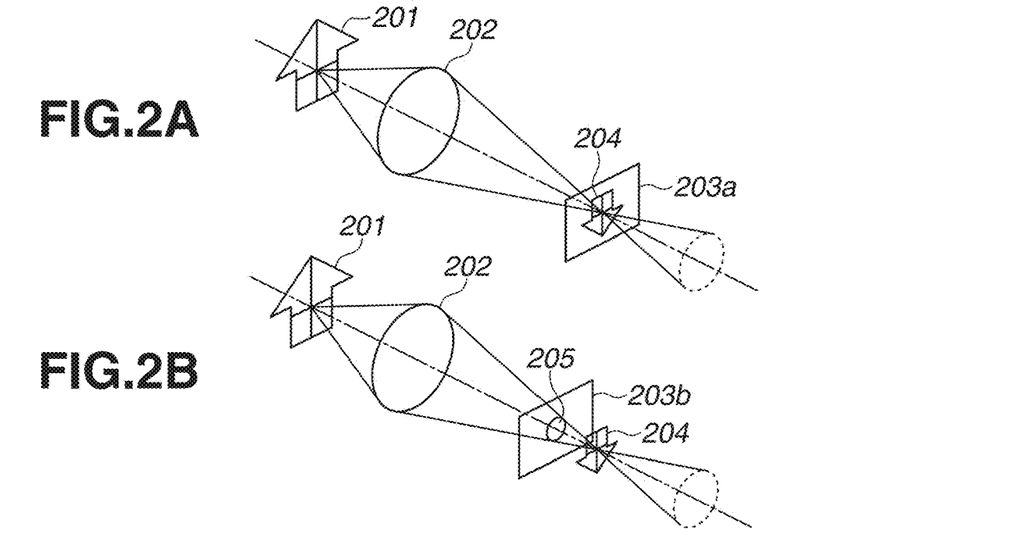
FIGS. 2A to 2D are diagrams illustrating how an object image is focused on an imaging plane according to the exemplary embodiment of the disclosure.

FIG. 2A illustrates how an optical lens 202 focuses an image 204 of an object 201 on a plane 203a. If the plane 203a and an image sensor surface of the imaging unit 104 coincide, the object 201 is focused as a "point" on the plane 203a and recorded as an in-focus image.

FIG. 2B illustrates a case in which the imaging plane of an image does not coincide with the image sensor surface. If an image sensor surface 203b is located in a position different from that of the plane 203a illustrated in FIG. 2A, an image of the object 201 focused by the optical lens 202 appears as a circle of confusion 205 on the image sensor surface 203b. If the circle of confusion 205 is smaller than a permissible circle of confusion of the image sensor, the circle of confusion 205 may be regarded as being equivalent to the "point" in focus, and an image equivalent to the in-focus image is obtained. On the other hand, if the circle of confusion 205 is greater than the permissible circle of confusion, a blurred image is obtained on the image sensor surface 203b.

Figure 2C:
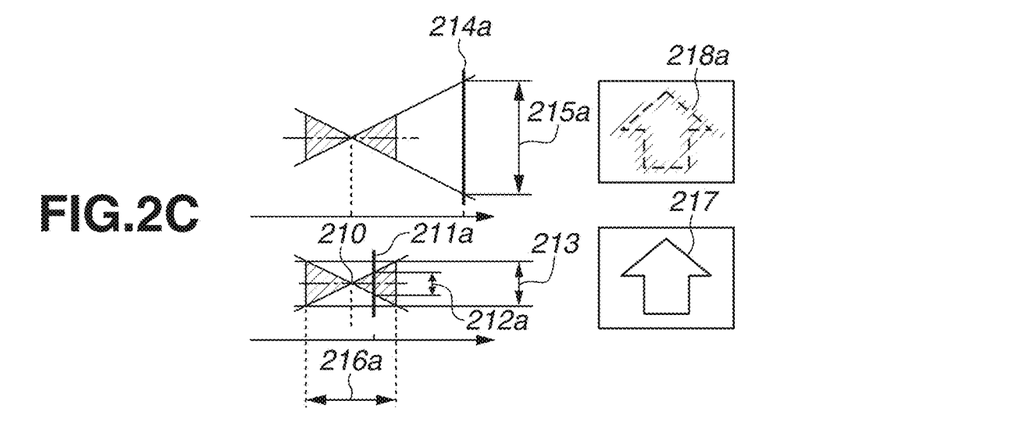

FIG. 2C is a diagram illustrating the foregoing state in a side view. If the object 201 is focused on a focal point 210 and the image sensor surface lies at the position of a plane 211a, a circle of confusion diameter 212a is obtained. The circle of confusion diameter 212a here is smaller than a permissible circle of confusion diameter 213 of the image sensor. An image 217 recorded by the image sensor is thus an in-focus image without a blur. On the other hand, if the image sensor surface lies at the position of a plane 214a, the resulting circle of confusion diameter 215a is greater than the permissible circle of confusion diameter 213. An image 218a on the image sensor surface 214a is thus a blurred image. A depth of focus 216a refers to the shaded areas where the circle of confusion diameter 212a is smaller than the permissible circle of confusion diameter 213. A depth of field is another representation of the depth of focus 216a, converted in terms of the object side.

Figure 2D:
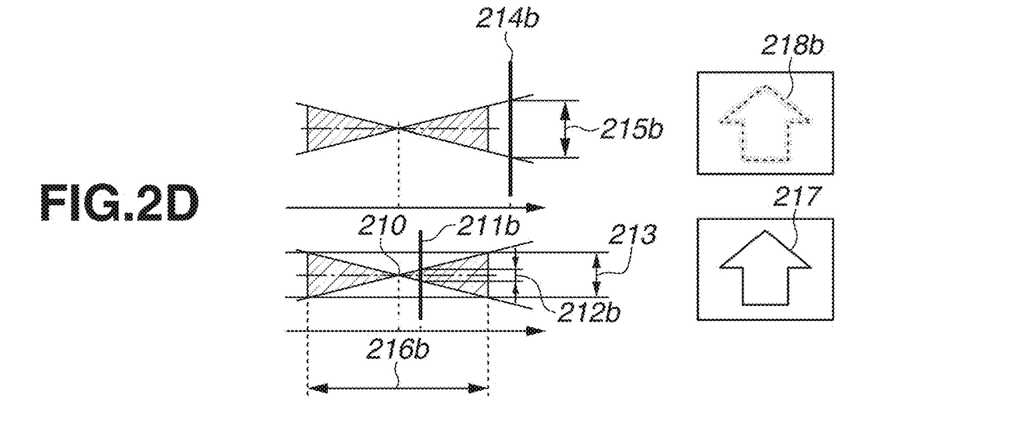

FIG. 2D is a diagram illustrating a state in which the diaphragm is narrowed, compared to FIG. 2C. In the state in which the diaphragm is narrowed, a difference in the diameter of the incident beam appears as a difference in depth. The result is a circle of confusion diameter 212b on a plane 211b, and a circle of confusion diameter 215b on a plane 214b. The circle of confusion diameter 215b of FIG. 2D is smaller than the circle of confusion diameter 215a of FIG.

2C. The resulting image 218*b* is an image with less blur (less out-of-focus amount) than the image 218*a*. A depth of focus 216*b* here is greater than the depth of focus 216*a*.

Figure 3:
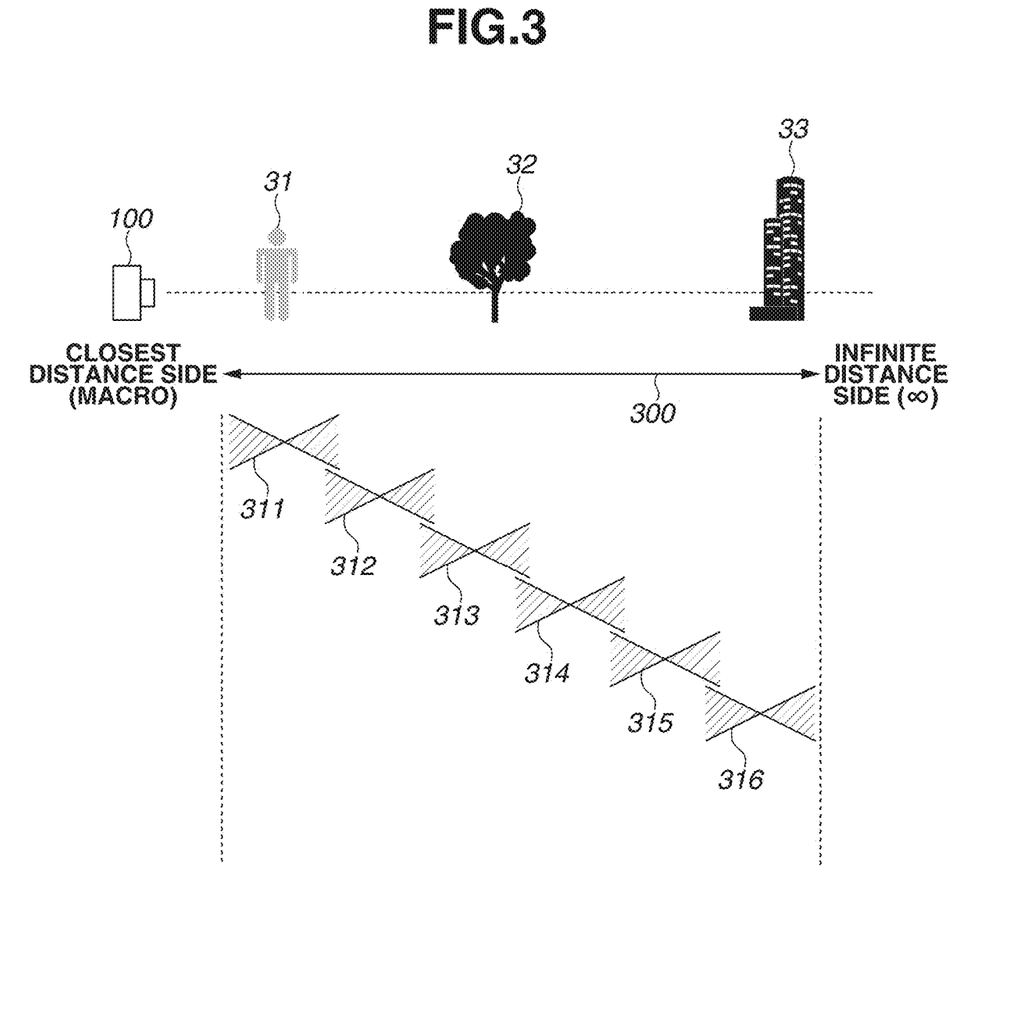
FIG. 3 is a diagram illustrating imaging by focus stacking according to the exemplary embodiment of the disclosure.

FIG. 3 is a diagram illustrating the imaging by focus stacking according to the present exemplary embodiment. Suppose that there are objects 31 to 33 to be brought into focus. The objects 31 to 33 are at respective different distances (object distances) from the digital camera 100. The objects 31 to 33 are situated in such order from the side close to the digital camera 100 (in a direction from a short distance side to a long distance side). To obtain a focus stacking image in which all the plurality of objects 31 to 33 is in focus, a focus range 300 (bracket range) in which focus bracket imaging is performed is to be covered with a plurality of depths of focus. Depths of focus 311 to 316 at respective rounds of imaging are arranged to cover the focus range 300. More specifically, imaging is performed (six images are captured) at focus positions that provide the depths of focus 311 to 316, whereby each of the objects 31 to 33 within the focus range 300 is in focus in any one of the images. Among the plurality of images thus captured, areas within the depths of focus in the respective rounds of imaging can be combined to obtain an image that is in focus across the entire focus range 300 (entire bracket area).

<Structure of Imaging Unit 104>

Figure 4A:
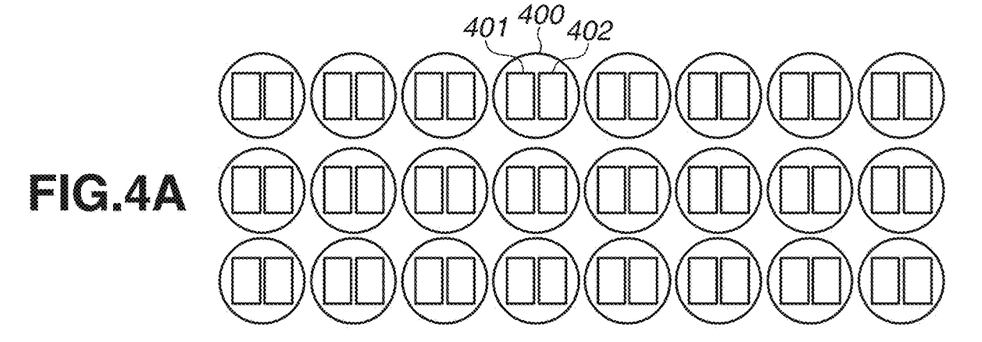
FIGS. 4A and 4B are diagrams illustrating a sensor included in an imaging unit.
Figure 4B:
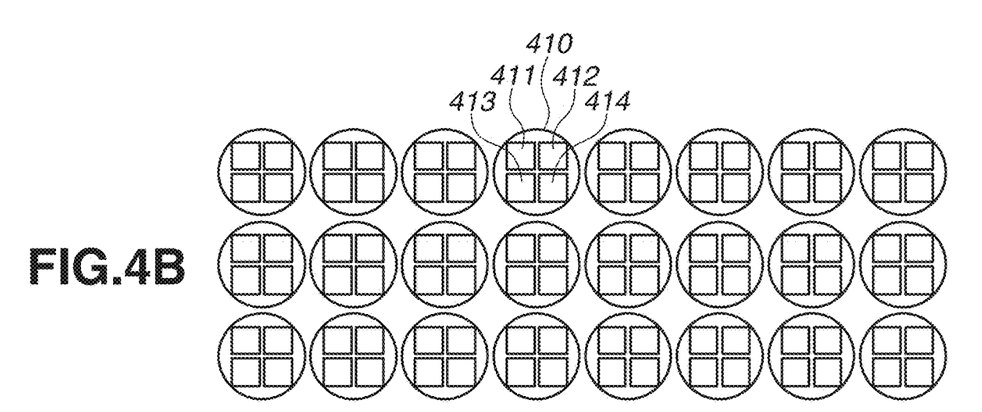
Figure 4C:
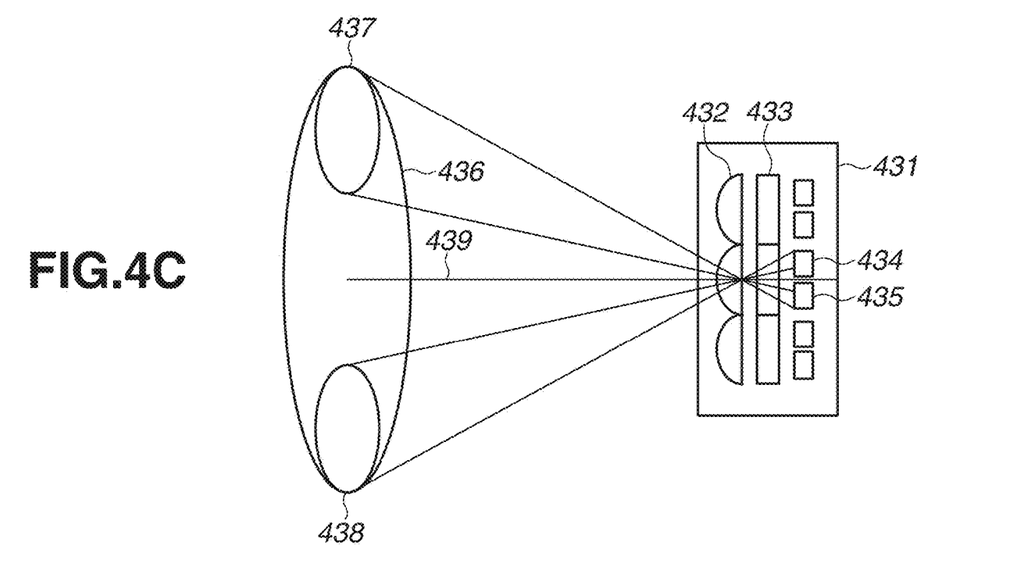
FIG. 4C is a diagram illustrating incidence of a light signal on a pixel according to the exemplary embodiment of the disclosure.

FIGS. 4A, 4B, and 4C are diagrams illustrating a sensor arranged in the imaging unit 104. FIG. 4A illustrates an element in which each pixel 400 includes two photoelectric conversion units 401 and 402. FIG. 4B illustrates an element in which each pixel 410 includes four photoelectric conversion units 411 to 414. If signals are independently read from the photoelectric conversion elements included in a pixel of the element illustrated in FIG. 4A or 4B, distance information about an object can be calculated. The independently-read signals of the respective photoelectric conversion units will be referred to as pupil division signals. If the pupil division signals are recorded together with the image signal, the control unit 101 can calculate relative positions of respective areas of the image in an optical axis direction through analysis by the image processing unit 107.

FIG. 4C illustrates the incidence of a light signal on a pixel of the element illustrated in FIG. 4A. In FIG. 4C, a pixel array 431 includes microlenses 432, color filters 433, and photoelectric conversion units 434 and 435. The photoelectric conversion units 434 and 435 belong to the same pixel and correspond to a microlens 432 and a color filter 433. FIG. 4C is a diagram illustrating the digital camera 100 as seen from above. FIG. 4C illustrates that the two photoelectric conversion units 434 and 435 corresponding to one pixel are laterally arranged. An exit pupil 436 emits a light beam, of which an upper portion with respect to an optical axis 439 (corresponding to a light beam from an area 437) is incident on the photoelectric conversion unit 435. A lower portion of the light beam (corresponding to a light beam from an area 438) is incident on the photoelectric conversion unit 434. More specifically, the photoelectric conversion units 434 and 435 receive light of respective different areas of the exit pupil 436 of the imaging lens. A signal optically received by the photoelectric conversion unit 434 will be referred to as an A image, while a signal optically received by the photoelectric conversion unit 435 will be referred to as a B image. The A and B images correspond to a pair of pupil division signals mentioned above. Based on a phase difference between the A and B images, a focus deviation amount can be calculated to obtain distance information.

Figure 5:
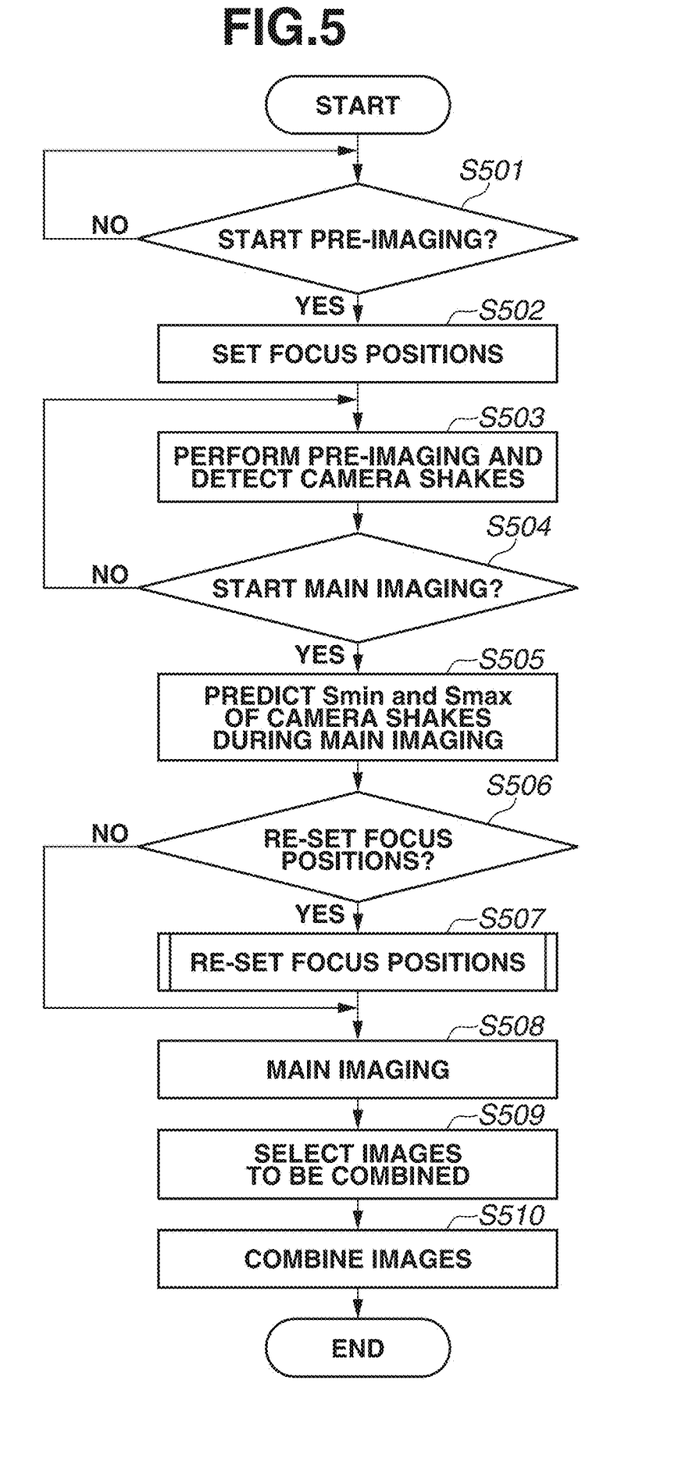
FIG. 5 is a flowchart illustrating the exemplary embodiment of the disclosure.

FIG. 5 is a flowchart illustrating the present exemplary embodiment.

In step S501, the control unit 101 issues a command to start pre-imaging. The processing then proceeds to step S502. For example, if the user half-presses a button provided on the operation unit 110, the operation unit 110 transmits a signal to the control unit 101, and the control unit 101 issues the command to start pre-imaging. On the other hand, if the button provided on the operation unit 110 is not pressed (NO in step S501), the control unit 101 repeats the loop of step S501.

In step S502, the control unit 101 sets focus positions. For example, the imaging unit 104 calculates distance information about an object. The control unit 101 sets focus positions based on the calculated distance information. For example, the control unit 101 sets focus positions at equal distances as illustrated in FIG. 3. If there is a plurality of objects, the control unit 101 sets focus positions based on distance information about the objects, calculated by the imaging unit 104, so that focus positions are set at smaller distances in sections where the objects exist, and at greater distances in sections where no object exists.

In step S503, the imaging unit 104 performs pre-imaging. At the same time, the apparatus motion detection unit 111 detects camera shakes.

In step S504, the control unit 101 determines whether to start main imaging. For example, when the user fully presses the button arranged on the operation unit 110, the operation unit 110 transmits a signal to the control unit 101. Then, the control unit 101 issues a command to start main imaging. On the other hand, if the button provided on the operation unit 110 is not full-pressed (NO in step S504), the processing returns to step S503.

In step S504, if the control unit 101 determines to start main imaging (YES in step S504), the processing proceeds to step S505. In step S505, the control unit 101 predicts camera shake amounts during main imaging based on camera shake information detected by the apparatus motion detection unit 111 in step S503. In the following description, a displacement of the digital camera 100 from an origin during pre-imaging will be denoted as f(t), where t represents a time. At the start of pre-imaging, t=0. For simplification, suppose that the digital camera 100 makes a one-dimensional displacement f(t).

Camera shakes s during main imaging can be expressed as the following (Eq. 1):

$$s_{min} \leq s \leq s_{max} \qquad (\text{Eq. 1})$$

In (Eq. 1), $s_{min}$ and $s_{max}$ are the maximum amounts of the camera shakes s on the closest distance side and infinite distance side during main imaging, respectively. In step S505, the control unit 101 predicts the foregoing maximum amounts $s_{min}$ and $s_{max}$.

For example, the maximum amounts of camera shakes on the closest distance side and infinite distance side during pre-imaging may be assumed as the maximum amounts $s_{min}$ and $s_{max}$. In such a case, the following (Eq. 2) holds:

$$s_{min} = \min_{t \in T} f(t), \; s_{max} = \max_{t \in T} f(t), \qquad (\text{Eq. 2})$$

where T is time from start to end of the pre-imaging.

In another example, average values of camera shakes of the digital camera 100 on the closest distance side and infinite distance side during pre-imaging may be assumed as the maximum amounts $s_{min}$ and $s_{max}$, respectively. In such a case, the following (Eq. 3) holds:

$$s_{min} = \frac{\int f(t)dt}{t} (f(t) \leq 0), s_{max} = \frac{\int f(t)dt}{t} (f(t) > 0). \quad \text{(Eq. 3)}$$

Values having the same absolute value may be assigned to the maximum amounts $s_{min}$ and $s_{max}$ as expressed by the following (Eq. 4):

$$s_{max} = -s_{min} = \frac{\int |f(t)|dt}{t}. \quad \text{(Eq. 4)}$$

(Eq. 4) can be modified as the following (Eq. 5):

$$s_{max} = -s_{min} = \alpha \cdot \frac{\int |f(t)|dt}{t}. \quad \text{(Eq. 5)}$$

In (Eq. 5), α is a coefficient having a value greater than 1. The provision of the coefficient α allows the control unit 101 to estimate the maximum amounts of camera shakes during main imaging to be somewhat greater.

If pre-imaging is performed for a long period of time, a predetermined partial time slot is used as the domain of t in the foregoing equations, instead of the entire duration of the pre-imaging from the time when the button is half-pressed. For example, if pre-imaging is performed for 60 seconds, camera shakes during main imaging may be predicted by using only the displacement f(t) of the digital camera 100 in the last 30 seconds thereof. Camera shakes during main imaging may also be predicted by using the displacement f(t) in the first 30 seconds.

In step S506, the control unit 101 determines whether to re-set focus positions. For example, the control unit 101 determines whether to re-set focus positions based on the camera shakes during main imaging, predicted in step S505. If the camera shakes during main imaging, predicted in step S505 are extremely small and are less than or equal to a predetermined amount defined in advance, the control unit 101 determines that the camera shakes are negligible, and does not re-set focus positions. If the mounting unit 112 detects that the digital camera 100 is mounted on a tripod, camera shakes will not occur. In such a case, the control unit 101 does not re-set focus positions, either. If the control unit 101 determines to re-set focus positions (YES in step S506), the processing proceeds to step S507. If the control unit 101 determines to not re-set focus positions (NO in step S506), the processing proceeds to step S508.

In step S507, the control unit 101 re-sets focus positions. In step S507, the control unit 101 can re-set focus positions by referring to the focus positions set in step S502. A re-setting method will be described below by using an example.

Figure 6:
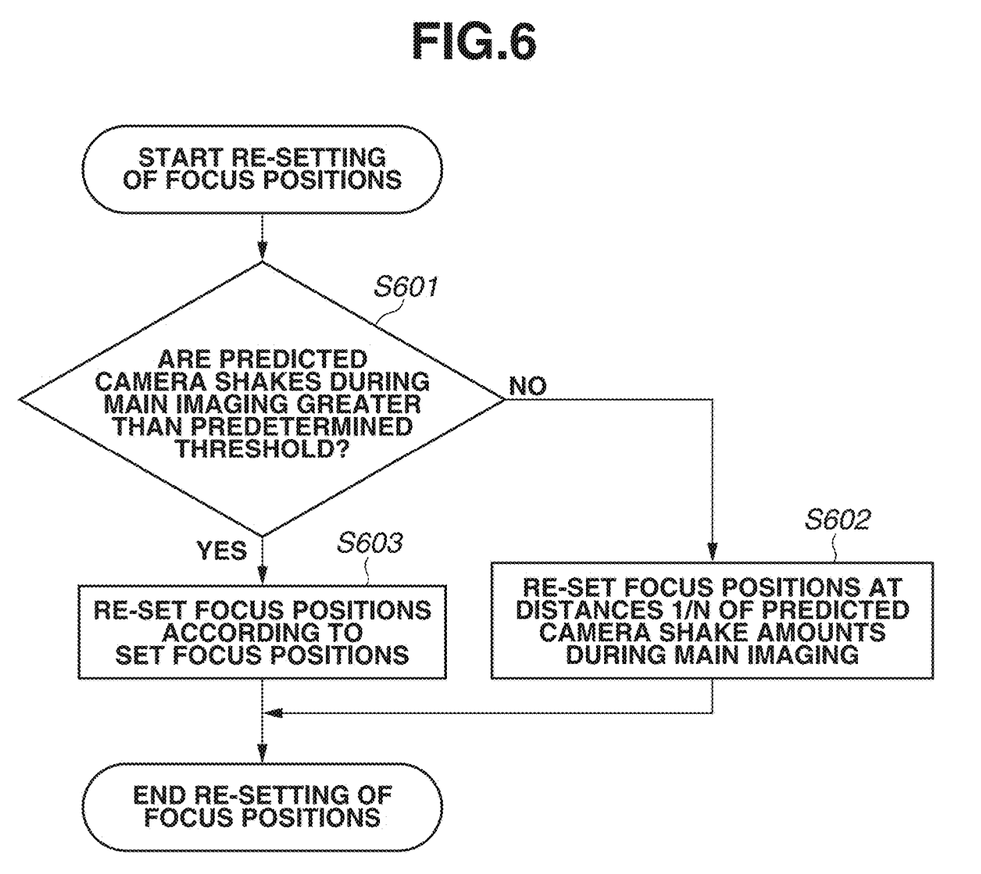
FIG. 6 is a flowchart illustrating re-setting of focus positions according to the exemplary embodiment of the disclosure.

FIG. 6 is a flowchart illustrating the re-setting of focus positions in step S507.

In step S601, the control unit 101 determines whether the camera shakes during main imaging, predicted in step S505, are greater than a predetermined threshold (i.e., first value). If the predicted camera shakes during main imaging are smaller than or equal to the predetermined threshold (NO in step S601), the processing proceeds to step S602. In step S602, the control unit 101 re-sets focus positions as described below so that the distances between the focus positions are reduced to increase the density of the focus positions.

Figure 7:
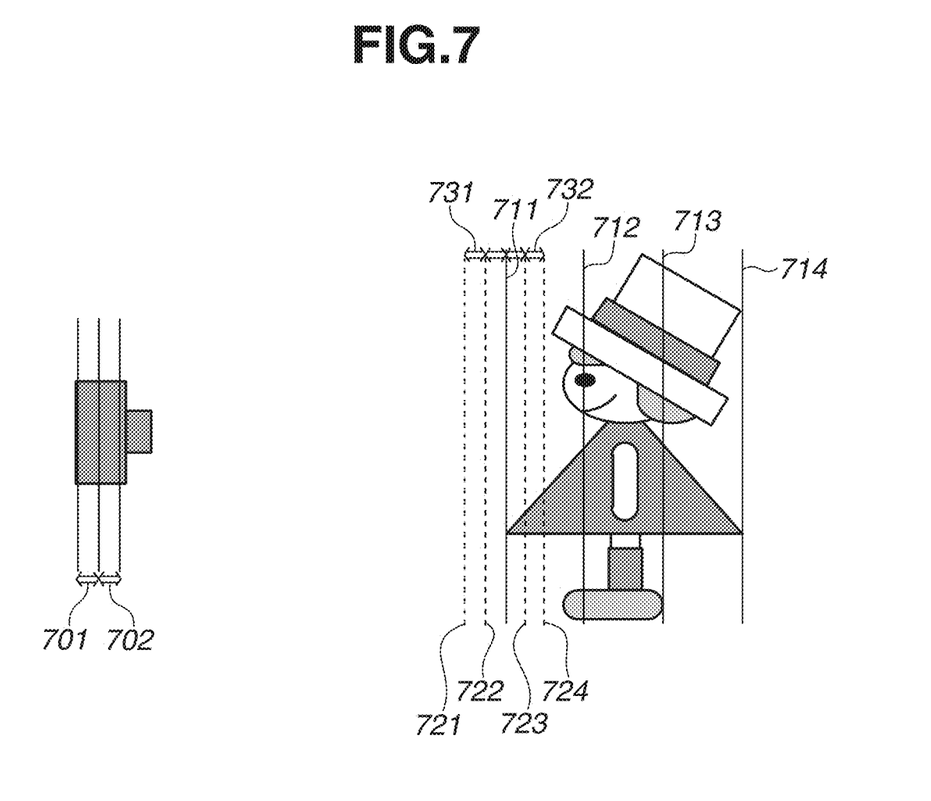
FIG. 7 is a diagram illustrating an example of the re-setting of focus positions according to the exemplary embodiment of the disclosure.

FIG. 7 is a diagram illustrating an example of the re-setting of focus positions in step S602. The focus positions illustrated in FIG. 7 are modified for better visibility and are not to scale. Camera shake amounts 701 and 702 represent the maximum amounts of camera shakes $s_{max}$ and $s_{min}$ during main imaging, predicted in step S505. Focus positions 711 to 714 represent the focus positions set by the control unit 101 in step S502. Focus positions 721 to 724 represent some of focus positions re-set near the focus position 711 by the control unit 101 in step S507. Like the focus positions 721 and 722, focus positions on the closest distance side of the focus position 711 are re-set at distances 731. Like the focus positions 723 and 724, focus positions on the infinite distance side of the focus position 711 are re-set at distances 732. The distances 731 and 732 are set according to the camera shake amounts 701 and 702. For example, the distance 731 is set to 1/N of the camera shake amount 701. N focus positions are then re-set on the closest distance side of the focus position 711. Here, the number of images to be captured is limited within a predetermined range so that the capacity of the built-in memory 109 is not exceeded.

By the foregoing re-setting, an actual focus position when an image is captured in any one of the re-set focus positions is expected to fit to a set focus position or a position very close to the set focus position even if camera shakes occur during the main imaging.

However, according to the foregoing method, the distance 732 increases if the camera shake amount 702 increases. As the distance 732 increases, an actual focus position when an image is captured in any one of the re-set focus positions becomes less likely to fit to a set focus position as expected in the processing of step S602. This negates the need to set the distance 732 according to the camera shake amount 702. Instead, focus positions are more reasonably re-set by referring to the set focus positions 711 and 712 without considering the camera shake amount 702. Consequently, if, in step S601, the control unit 101 determines that the predicted camera shakes during main imaging are greater than the predetermined threshold (YES in step S601), the processing proceeds to step S603. In step S603, the control unit 101 re-sets focus positions according to the set focus positions. For example, the control unit 101 re-sets focus positions at equal distances between the focus positions 711 and 714, within the capacity of the built-in memory 109. If the focus positions 711 to 714 are not set at equal distances in step S502, the control unit 101 re-sets focus positions at equal distances between adjoining set focus positions (for example, the focus positions 711 and 712). In such a case, the control unit 101 does not need to re-set all focus positions at equal distances.

The threshold (i.e., second value) used for the determination of the control unit 101 in step S601 can be determined as in the following example. Suppose, for example, that focus positions are set at equal distances in step S502. In such a case, the threshold in step S601 may be ½ of the distance set in step S502. Alternatively, considering a difference between the camera shakes on the closest distance side and the infinite distance side, a threshold TH1 on the closest distance side and a threshold TH2 on the infinite distance side are set by the following (Eq. 6) and (Eq. 7):

$$TH1 = \frac{s_{min}}{s_{min} + s_{max}} \cdot L, \text{ and} \quad \text{(Eq. 6)}$$

$$TH2 = \frac{s_{max}}{s_{min} + s_{max}} \cdot L. \quad \text{(Eq. 7)}$$

In (Eq. 6) and (Eq. 7), $s_{min}$ and $s_{max}$ represent those in (Eq. 2) to (Eq. 5). L is the distance between the set focus positions.

In step S508, the control unit 101 repeats, up to a predetermined number of times, an operation in which the imaging unit 104 performs main imaging while moving the focus position of the optical system 103 to the focus positions set in step S502 and those re-set in step S506. The captured images are temporarily stored in the built-in memory 109.

In step S509, the control unit 101 selects images to be combined from among the plurality of images captured in step S508. In step S509, the control unit 101 can select the images captured at the focus positions set in step S502. If it is difficult to capture all images fitting exactly to the set focus points, i.e., there are some focus positions where image is not captured, the control unit 101 selects images according to the following conditions. Suppose that Pn is nth set focus position, and Pn' is a focus position of an image that is captured at a focus position closest to Pn among the images selected in step S509. The number of selected images is previously determined to be M which is the same as the number of focus positions set in step S502.

In step S509, the control unit 101 selects images that satisfy both the following conditions.

Condition 1: Minimize D in the following (Eq. 8):

$$D = \sum_{n=1}^{M} (P_n - P'_n)^2. \quad \text{(Eq. 8)}$$

Condition 2: A difference between the focus positions of adjoining images selected falls within the depth of field.

The control unit 101 selects images to satisfy the foregoing conditions. Such conditions are merely an example, and various modifications may be made. For example, the foregoing condition 1 may be replaced by the following condition 1' to make the distances between the focus positions at which the images to be combined are captured as equal as possible.

Condition 1': Minimize D in the following (Eq. 9):

$$D = \sum_{n=1}^{M-2} (|Q_n - Q_{n+1}| - |Q_{n+1} - Q_{n+2}|)^2, \quad \text{(Eq. 9)}$$

where $Q_n$ is the focus position at which nth image among the selected images is captured.

In step S510, the image processing unit 107 combines the images selected by the control unit 101 in step S509. A combining method will be described briefly below. The image processing unit 107 generates a combination map by using contrast values of the respective selected images. Specifically, an image or images having the highest contrast value among the selected images is/are given a combination ratio of 100%, and the other images a combination ratio of 0%. If the combination ratio changes from 0% to 100% (or 100% to 0%) between adjoining pixels, the combination boundary looks noticeably unnatural. A low-pass filter having a predetermined number of pixels (number of taps) is then applied to the combination map so that the combination ratio does not change sharply between adjoining pixels. The image processing unit 107 may generate a combination map from a contrast distribution of the selected images so that the images have high combination ratios in areas where the contrast is high.

According to the present exemplary embodiment, camera shakes during main imaging are predicted through pre-imaging, and focus positions for imaging are re-set so that if camera shakes occur during main imaging, some of the captured images can be selected and combined to reduce the effect of the camera shakes on the combined image.

The foregoing exemplary embodiment has been described based on the implementation in a digital camera. However, the disclosure is not limited to a digital camera. For example, an exemplary embodiment of the disclosure may be implemented in a portable device with a built-in image sensor, or a network camera capable of capturing images.

An exemplary embodiment of the disclosure may be implemented by processing that supplies a program for implementing one or more functions of the foregoing exemplary embodiment to a system or an apparatus via a network or a recording medium, and reads and executes the program by one or more processors of a computer of the system or apparatus. An exemplary embodiment of the disclosure may be implemented by a circuit that implements one or more of the functions (for example, ASIC).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-211522, filed Oct. 28, 2016, which is hereby incorporated by reference herein in its entirety.

What is claimed is:

1. An image pickup apparatus comprising:
an imaging sensor configured to capture a plurality of images while changing a focus position of an optical system;
a storage medium configured to store the images captured by the imaging sensor;
at least one memory configured to store instructions;
at least one processor in communication with the at least one memory and configured to execute the instructions to:
set a plurality of focus positions at which the plurality of images is captured;
detect a shake amount of the imaging sensor;
combine at least some of the plurality of images; and
determine a number of the plurality of focus positions based on a capacity of the storage medium,
wherein the at least one processor executes further instructions to change distances between the plurality of focus positions based on a shake amount detected, and set at least some of the plurality of focus positions at equal distances based on the shake amount.

2. The image pickup apparatus according to claim 1, wherein the at least one processor executes further instructions to, if the shake amount is greater than a first value, make the distances between the plurality of focus positions narrower than if the shake amount is not greater than the first value.

3. The image pickup apparatus according to claim 1, wherein the at least one processor executes further instructions to, if the shake amount is greater than a first value, make a density of the plurality of focus positions higher than if the shake amount is not greater than the first value.

4. An image pickup apparatus comprising:
an imaging sensor configured to capture a plurality of images while changing a focus position of an optical system;
at least one memory configured to store instructions;
at least one processor in communication with the at least one memory and configured to execute the instructions to:
set a plurality of focus positions at which the plurality of images is captured;
detect a shake of the imaging sensor; and
combine at least some of the plurality of images,
wherein the at least one processor executes further instructions to change distances between the plurality of focus positions based on a shake amount detected, and set at least some of the plurality of focus positions at equal distances based on the shake amount, and
wherein the at least one processor executes further instructions to, if the shake amount is greater than a first value, make the distances between the plurality of focus positions narrower than if the shake amount is not greater than the first value, and
if the shake amount is greater than the first value and is smaller than a second value that is greater than the first value, to make the distances between the plurality of focus positions narrower than if the shake amount is greater than the first and second values.

5. An image pickup apparatus comprising:
an imaging sensor configured to capture a plurality of images while changing a focus position of an optical system;
at least one memory configured to store instructions;
at least one processor in communication with the at least one memory and configured to execute the instructions to:
set a plurality of focus positions at which the plurality of images is captured;
detect a shake of the imaging sensor; and
combine at least some of the plurality of images,
wherein the at least one processor executes further instructions to change distances between the plurality of focus positions based on a shake amount detected, and set at least some of the plurality of focus positions at equal distances based on the shake amount, and
wherein the at least one processor executes further instructions to, if the shake amount is greater than a first value, make a density of the plurality of focus positions higher than if the shake amount is not greater than the first value, and
if the shake amount is greater than the first value and is smaller than a second value that is greater than the first value, to make the density of the plurality of focus positions higher than if the shake amount is greater than the first and second values.

6. The image pickup apparatus according to claim 1, wherein the at least one processor executes further instructions to set the plurality of focus positions at which the plurality of images is captured based on a plurality of focus positions set in advance and the shake amount.

7. The image pickup apparatus according to claim 6, wherein the at least one processor executes further instructions to set the plurality of focus positions at which the plurality of images is captured so that a new focus position is arranged between the plurality of focus positions set in advance.

8. An image pickup apparatus comprising:
an imaging sensor configured to capture a plurality of images while changing a focus position of an optical system;
at least one memory configured to store instructions;
at least one processor in communication with the at least one memory and configured to execute the instructions to:
set a plurality of focus positions at which the plurality of images is captured;
detect a shake of the imaging sensor; and
combine at least some of the plurality of images,
wherein the at least one processor executes further instructions to change distances between the plurality of focus positions based on a shake amount detected, and set at least some of the plurality of focus positions at equal distances based on the shake amount;
and to set the plurality of focus positions at which the plurality of images is captured based on a plurality of focus positions set in advance and the shake amount so that new focus positions are at equal distances arranged between the plurality of focus positions set in advance.

9. An image pickup apparatus comprising:
an imaging sensor configured to capture a plurality of images while changing a focus position of an optical system;
at least one memory configured to store instructions;
at least one processor in communication with the at least one memory and configured to execute the instructions to:
set a plurality of focus positions at which the plurality of images is captured;
detect a shake of the imaging sensor; and combine at least some of the plurality of images,
wherein the at least one processor executes further instructions to change distances between the plurality of focus positions based on a shake amount detected, and set at least some of the plurality of focus positions at equal distances based on the shake amount;
and to set the plurality of focus positions at which the plurality of images is captured based on a plurality of focus positions set in advance and the shake amount so that new focus positions are on a closest distance side and an infinite distance side of the plurality of focus positions set in advance.

10. The image pickup apparatus according to claim 4,
wherein the at least one processor executes further instructions to set the plurality of focus positions at which the plurality of images is captured based on a plurality of focus positions set in advance and the shake amount, and
wherein the second value is determined based on a distance between the plurality of focus positions set in advance.

11. The image pickup apparatus according to claim 10, wherein the second value is determined to be approximately ½ of the distance between the plurality of focus positions set in advance.

12. The image pickup apparatus according to claim 10, wherein the second value is determined based on a ratio between a shake amount on a closest distance side and a shake amount on an infinite distance side, the shake amounts being detected.

13. The image pickup apparatus according to claim 6,
wherein the imaging sensor includes a plurality of pixels having a structure in which a plurality of photoelectric conversion units corresponds to a microlens, and
wherein the plurality of focus positions set in advance is set based on pupil division signals obtained by the imaging sensor.

14. The image pickup apparatus according to claim 6, wherein the at least one processor executes further instructions to, if the image pickup apparatus is detected to be mounted on a fixing device, set the plurality of focus positions set in advance as the plurality of focus positions at which the plurality of images is captured.

15. The image pickup apparatus according to claim 14, wherein the fixing device is a tripod.

16. An image pickup method comprising:
capturing by an imaging sensor a plurality of images while changing a focus position of an optical system;
storing the images captured by the capturing in a storage medium,
setting a plurality of focus positions at which the plurality of images is captured;
detecting a shake amount of the imaging sensor;
combining at least some of the plurality of images; and
determining a number of the plurality of focus positions based on a capacity of the storage medium,
wherein, in the setting, distances between the plurality of focus positions are changed based on the detected shake amount and at least some of the plurality of focus positions are set at equal distances based on the shake amount.

17. An image pickup method comprising:
performing pre-imaging as first imaging;
capturing by an imaging sensor a plurality of images while changing a focus position of an optical system during main imaging as second imaging after the first imaging;
storing the images captured by the capturing in a storage medium;
setting a plurality of focus positions at which the plurality of images is captured;
detecting a shake of the imaging sensor;
combining at least some of the plurality of images; and
determining a number of the plurality of focus positions based on a capacity of the storage medium,
wherein the plurality of focus positions is set based on a shake amount detected during the first imaging.

* * * * *